United States Patent [19]

Clifton

[11] 3,936,023

[45] Feb. 3, 1976

[54] LIGHT HOLDER

[75] Inventor: Arthur E. Clifton, Three Rivers, Mich.

[73] Assignee: Armstrong Machine Works, Three Rivers, Mich.

[22] Filed: July 23, 1974

[21] Appl. No.: 490,980

[52] U.S. Cl. .................... 248/228; 52/28; 240/52.1

[51] Int. Cl.². F16B 1/00; E04G 17/18; F16B 12/00

[58] Field of Search ............. 248/228, 342, 343, 72; 52/28, 39; 240/73 QD, 73 DA, 52.1

[56] References Cited

UNITED STATES PATENTS

| | | | |
|---|---|---|---|
| 3,429,538 | 2/1969 | Natale | 248/228 |
| 3,459,399 | 8/1969 | Everson | 248/228 X |
| 3,589,660 | 6/1971 | Dunckel | 52/39 X |
| 3,596,084 | 7/1971 | Henning | 240/52.1 |
| 3,618,176 | 11/1971 | Barnes | 248/343 X |

*Primary Examiner*—J. Franklin Foss

*Attorney, Agent, or Firm*—Woodhams, Blanchard and Flynn

[57] ABSTRACT

A light holder for releasable attachment to an overhead member, such as a rail associated with the grid system of a suspended ceiling. The light holder includes a pair of elongated support members which are fixed together adjacent corresponding one ends thereof. A pair of oppositely facing clips are provided adjacent said one ends of the support members, which clips are adapted to engage the flanges of an overhead rail. The support members are provided with a further pair of oppositely facing clips adjacent the opposite ends thereof. The opposite ends of the support members are normally positioned closely adjacent one another, but can be resiliently deflected outwardly to separate the further clips to permit positioning of an overhead rail therebetween. Release of the opposite ends of the support members, causes the further clips to be moved inwardly into clamping engagement with the flanges of the rail. A ring-like locking member is slidably mounted on the support members and is movable longitudinally therealong. When positioned adjacent the further clips, the locking member locks the clips in engagement with the rail. The support members also have a suitable mounting post or other structure associated therewith for permitting a conventional light to be fixedly but releasably attached thereto.

11 Claims, 4 Drawing Figures

LIGHT HOLDER

FIELD OF THE INVENTION

This invention relates to an improved light holder which can be releasably attached to an overhead rail, such as a rail associated with the grid system of a suspended ceiling, for permitting a light to be easily and releasably suspended therefrom.

BACKGROUND OF THE INVENTION

In most indoor video or photo projects, there is a need for a portable, rapidly mountable, yet accurate and safe, mounting for the lighting assemblies used to light the set. At the present time, this is normally done by using floor stands which have lights mounted adjacent the upper ends thereof. However, such stands are relatively unstable and are easily tipped over, thereby often resulting in damage to the light and, at the very least, breaking of the light bulb, which bulbs are expensive. The use of such stands also results in the electrical cables being run along the floor, which is hazardous and can result in tripping of personnel and possible tipping of the light stands.

In the more complete and larger studios, lighting is normally provided by a grid which is made from lightweight pipe and hung permanently from the ceiling, which grid supports thereon one or more lights supplied with electricity from an overhead arrangement. While these grids work satisfactorily, nevertheless they are restricted to use in studios and they can not readily be moved about. Such grids are relatively massive and expensive, and because they are not portable, they are not satisfactory for use in many situations.

Accordingly, it is an object of the present invention to provide an improved light holder which overcomes the above-mentioned disadvantages. Particularly, it is an object of the present invention to provide:

1. An improved light holder for mounting a light in an overhead manner, which holder is readily portable so as to be capable of being moved about at will.
2. A light holder, as aforesaid, which is suitable for use with ceilings which are of the conventional suspended type employing a plurality of panels supported on a grid-like frame, which ceilings are widely used in plants, factories, offices, studios and the like.
3. A light holder, as aforesaid, which can be readily attached to or removed from an overhead rail associated with the grid work of a suspended ceiling to permit a light to be suspended therefrom.
4. A light holder, as aforesaid, which enables both the light and the electrical cables to be suspended in an overhead manner so as not to interfere with the operating personnel located therebelow.
5. A light holder, as aforesaid, which can be readily attached to or removed from an overhead rail without requiring any tools, and which can be attached to or removed from the rail in a simple manner requiring very little time.
6. A light holder, as aforesaid, which is extremely light in weight, small in size, inexpensive to manufacture, durable in operation, and easy to handle and manipulate.

Other objects and advantages of the invention will become apparent to persons acquainted with devices of this general type upon reading the following specification and inspecting the accompanying drawings.

SUMMARY OF THE INVENTION

The objects and purposes of the present invention are met by providing a light holder having a pair of elongated plate-like support members disposed substantially in a side-by-side relationship with one another. The support members are fixedly connected together adjacent one end thereof, and the other ends are normally positioned closely adjacent one another but are capable of being resiliently deflected outwardly away from each other. The support members adjacent said other end are provided with a first pair of oppositely facing clips which are adapted to releasably engage an overhead rail, such as the flanges often inverted T-shaped rail. A second pair of oppositely facing clips are fixed to the support members adjacent said one end thereof, and are adapted to engage the rail at positions spaced along the rail from the first pair of clips. The support members also have light support means fixed thereto adjacent said one end thereof, which light support means is adapted to have a conventional photographic or video light releasably attached thereto. The light holder is positioned directly beneath a rail in substantially perpendicular relationship therewith and is then rotated horizontally so that the clips of the second pair engage the flanges of the rail, with the first pair of clips being disposed below the rail. The other ends of the support members are resiliently deflected apart and are then moved upwardly until the first pair of clips straddle the rail. The support members are then released, causing the first pair of clips to engage the rail. A locking member is slidably supported on the support members and is slidably movable from a position adjacent the second pair of clips toward the first pair of clips for locking the first pair of clips in engagement with the rail.

DETAILED DESCRIPTION

Figure 1:
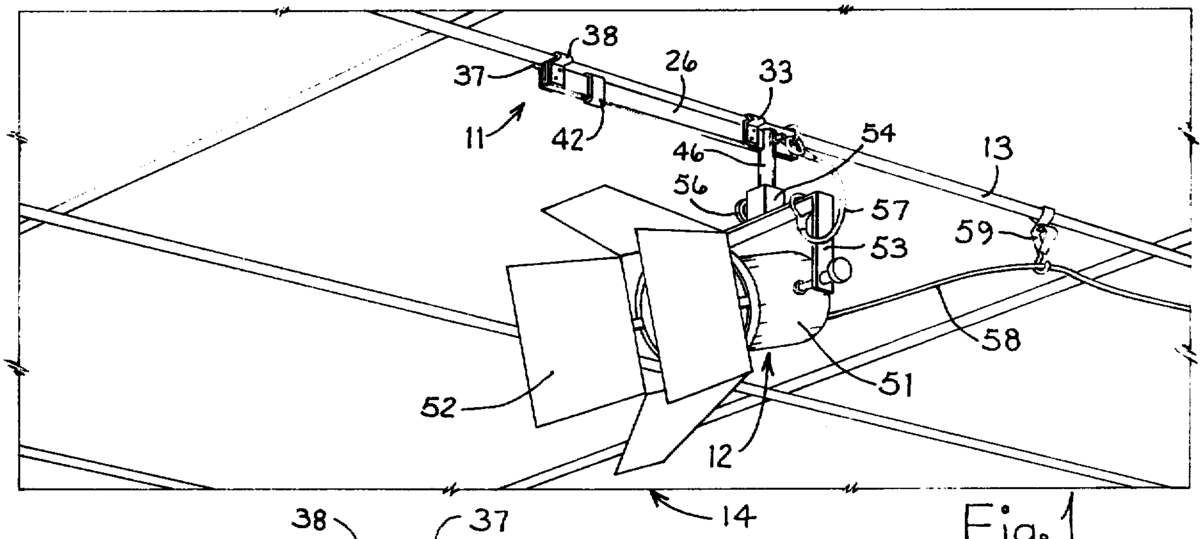
FIG. 1 is a fragmentary perspective view of an overhead suspended ceiling having a light suspended therefrom by means of an improved holder according to the present invention.

FIG. 1 illustrates therein a light holder 11 according to the present invention, same having a conventional photographic or video light 12 releasably mounted thereon. The holder 11 is adapted to be releasably attached to an overhead rail 13 associated with the grid work of a conventional suspended ceiling 14.

Figure 2:
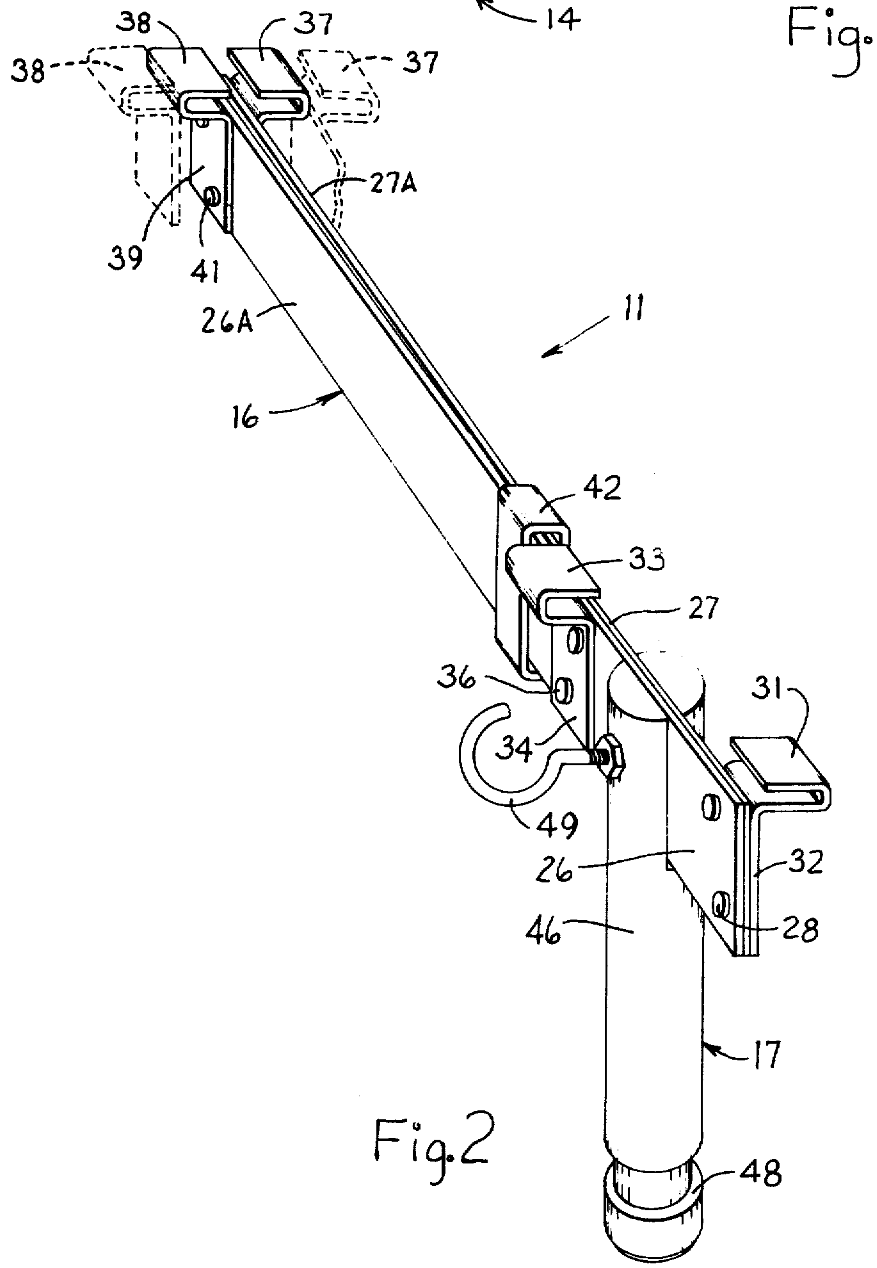
FIG. 2 is a perspective view of the improved holder according to the present invention, same being illustrated in an unmounted condition.
Figure 4:
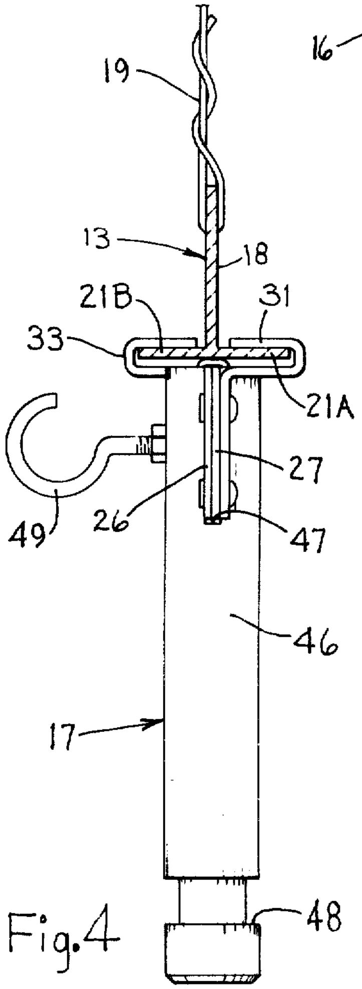
FIG. 4 is a cross-sectional view taken substantially along the line IV—IV in FIG. 3.
Figure 3:
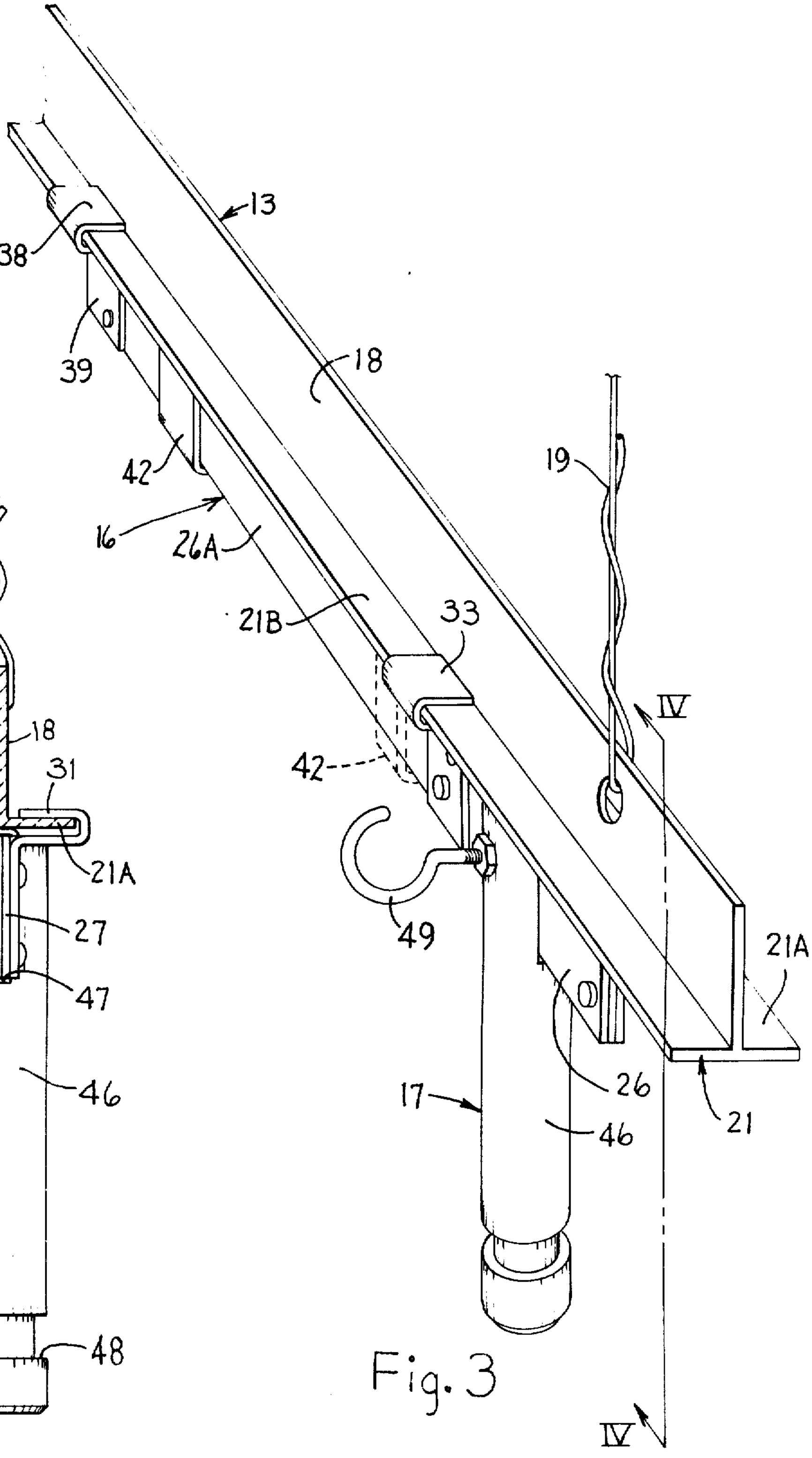
FIG. 3 is a perspective view of the holder clampingly engaged with an overhead rail.

The light holder 11, as illustrated in FIGS. 2–4, includes rail engaging means 16 which is adapted to be disposed directly beneath and extend along the rail 13. A light mounting means 17, here a post, is fixedly secured to the rail engaging means 16 adjacent one end thereof.

The rail 13, as is conventional, has an inverted T-shaped cross section and includes a central vertical web 18 which is interconnected to a ceiling disposed thereabove, such as by being suspended therefrom by a wire 19. A lower substantially horizontally extending flange 21 is secured to and extends along the lower edge of the central vertical web 18. The web 18 engages the lower flange 21 substantially at the midpoint thereof so that the flang has portions 21A and 21B extending outwardly from the opposite sides thereof.

The rail engaging means 16 includes a pair of elongated plate-like support members 26 and 27 which are disposed substantially in side-by-side relationship with respect to one another. The support members 26 and 27 are fixedly interconnected adjacent one end thereof, such as by rivets 28 and 36, so as to be contiguous at that one end. A first substantially U-shaped clip 31 is fixedly secured, such as by the rivets 28, to the support members 26 and 27 adjacent said one end thereof. The clip 31, in the illustrated embodiment, has a plate-like mounting portion 32 fixedly secured to one of the edges thereof and positioned to overlie the adjacent face of the support member 27, whereupon the clip 31 is thus fixed to the support members by means of the rivets 28. A further U-shaped clip 33 is also provided in the vicinity of said clip 31, the clip 33 being provided with a plate-like mounting portion 34 which is disposed adjacent the exterior face of the support member 26. The clip 33 is secured to the support members by means of rivets 36.

As illustrated in FIG. 2, the clips 31 and 33 are disposed so that the U-shaped slots thereof open toward one another in oppositely facing relationship. However, the clips 31 and 33 are spaced a selected distance apart along the longitudinal direction of the support members 26 and 27. In the illustrated embodiment, the clip 31 is disposed directly adjacent the free ends of the support members, whereas the clip 33 is spaced intermediate the ends of the support members, being spaced about one-third of the overall length of the support members from the clip 31. Thus, the support members 26 and 27 are rigidly secured together in contiguous relationship between the clips 31 and 32.

A further pair of U-shaped clips 37 and 38 are fixedly secured to the support members 26 and 27, respectively, adjacent the other ends thereof. For this purpose, the clip 38 is provided with a plate-like mounting flange 39 which is disposed directly adjacent the external surface of the support member 26 and is fixed to the support member by means of rivets 41. The clip 37 is fixedly connected to the support member 27 in a similar manner. The pair of clips 37 and 38 are disposed so that their U-shaped slots open toward one another. Further, the clips 37 and 38 are disposed directly opposite one another in the immediate vicinity of the free ends of the support members 26 and 27.

All of the clips 31, 33, 37 and 38 are disposed so that the lower leg thereof is positioned substantially flush with or slightly above the upper longitudinally extending edges of the support members 26 and 27. This thus positions the slot, formed between the vertically spaced legs of the individual clips, above the upper edges of the support members so as to be capable of receiving therein the flange portions 21A and 21B of the rail 13, whereby the support members 26 and 27 are then positioned directly below and close to the lower surface of flange 21.

As illustrated in FIG. 2, the end portions 26A and 27A of the support members are normally positioned closely adjacent one another so that the spacing between the clips 37 and 38 is normally less than the width of the flange 21. However, the support members 26 and 27 are made of a material having adequate strength and resiliency, such as steel, so that 'd end portions 26A and 27A can be resiliently flexed outwardly away from one another so as to substantially increase the spacing between the clips 37 and 38. The end portions 26A and 27A have sufficient resiliency so that they can be flexed outwardly, as by being manually pulled apart, by a sufficient distance so that the spacing between the clips 37 and 38 is greater than the width of the flange 21. However, the resiliency of the end portions 26A and 27A will cause them to automatically return to a position closely adjacent one another when the separating or flexing force is released.

To enable the end portions 26A and 27A to be locked together, there is provided a locking means in the form of a locking ring 42 which is slidably supported on the support members 26 and 27, between clip 33 and clips 37 and 38, and in closely surrounding relationship to the support members. The ring 42, when positioned adjacent the clip 33, permits the end portions 26A and 27A to be resiliently flexed outwardly in spaced relationship to one another. On the other hand, by slidably displacing the locking ring 42 longitudinally along the end portions 26A and 27A toward the clips 37 and 38, the end portions 26A and 27A can be locked together in their innermost positions. When the ring 42 is moved in the opposite direction, the end portions 26A and 27A are free to be manually flexed outwardly away from one another.

Considering now the light mounting means 17, same includes a substantially cylindrical post 46 which is fixedly secured to the rail engaging means 16 and extends downwardly therefrom in a substantially vertical direction. For this purpose, the post 46 is provided with an elongated narrow slot 47 formed in the upper end thereof, which slot snugly receives therein the superimposed support members 26 and 27, at a location disposed between the clips 31 and 33. The post 46 can be fixedly secured to the support members 26 and 27 in any conventional manner, such as by welding, as by a press fit, or by means of a screw. The support spot 46 is provided with an annular undercut recess 48 adjacent the lower end thereof, and the post 46 is also provided with a saftey hook 49 fixedly secured thereto. The purpose of these structures will be explained hereinafter.

The light 12 which is adapted to be mounted on the light mounting means 17 can be of any conventional construction, and one such known construction is illustrated in FIG. 1. The known light 12 includes a conventional housing 51 which mounts therein a suitable bulb, which housing has adjustable reflectors 52 associated therewith. The housing 51 is pivotally supported on a yoke 53 which has a sleevelike hub 54 fixedly secured thereto. The hub 54 has a bore therein which is adapted to receive therein the downwardly extending post 46, and for this purpose the hub 54 has a manually rotatable locking screw 56 associated therewith which is adapted to extend into the recess 48 for securing the hub 54 to the post 46. The light 12 may also include a saftey rope 57 having one end thereof attached to the light and the other end thereof adapted to be hooked over the saftey hook 49. The electrical energy is supplied to the light 12 by means of a conventional cable or cord 58, which cord can be suspended along the ceiling by a plurality of detachable hooks 59 of any suitable construction.

OPERATION

To utilize the light holder 11, the locking ring 42 is located in its retracted position as illustrated in FIG. 2. The holder 11 is then positioned horizontally directly beneath the selected rail 13 so that the longitudinal direction of the support members 26 and 27 extends substantially at right angles to the longitudinal direction of the rail 13. Further, the holder 11 is positioned such that the railing 13 intersects the support members 26 and 27 in the region between the clips 31 and 33, such as by positioning the post 46 substantially directly beneath the rail. When so positioned, the clips 31 and 33 are disposed on opposite sides of the rail.

With the light holder 11 positioned beneath the rail as described above, the holder 11 is then rotated horizontally through an angle of approximately 90°, which thus results in the clips 31 and 33 being moved into engagement with the opposed flange portions 21A and 21B, respectively, substantially as illustrated in FIG. 4. This rotation of the light holder 11 also results in the support members 26 and 27 being disposed directly under the rail 13 in substantial alignment therewith. Since the width of the slots defined by the clips 31 and 33 is slightly greater than the thickness of the flange portions 21A and 21B, this enables the light holder 11 to be slightly angularly titled relative to the rail whereby one of the clips 37 or 38 can pass under the rail 13. With the clips 31 and 33 engaged with the flange 21, and with the support members 26 and 27 disposed directly under the rail, the end portions 26A and 27A are then manually resiliently deflected outwardly away from one another so that the clips 37 and 38 are spaced from one another by a distance greater than the width of the rail. The holder 11 is then pivotally swung upwardly toward the rail so that the clips 37 and 38 pass upwardly on opposite sides of the flange portions 21A and 21B. After the clips 37 and 38 have been moved upwardly so as to be disposed outwardly on opposite sides of the flange 21, then the manual spreading force imposed on the leg portions 26A and 27A is relieved whereby the end portions 26A and 27A relatively move toward one another. This causes the clips 37 and 38 to be moved toward one another into overlapping engagement with the flange portions 21A and 21B, respectively. The locking ring is then slidably moved into a position adjacent the clips 37 and 38 to thus lock the opposed pair of movable clips 37 and 38 in engagement with the flange 21.

After the holder 11 has been mounted on the rail 13 as described above, then the light 12 can be mounted on the holder by sliding the hub 54 upwardly onto the post 46 and by tightening the locking screw 56 so that same engages within the undercut recess 48. The electrical cable 58 can then be suspended along the ceiling by utilization of one or more releasable clips 59 which can be attached to the rail 13 at suitable locations.

When it is desired to remove the lighting assembly, the light 12 is removed from the holder 11 in the reverse manner to that described above. That is, the locking ring 42 is slidably returned to its position adjacent the clip 33. The end portions 26A and 27A are then manually sprung outwardly with respect to one another, thus moving the clips 37 and 38 outwardly a sufficient distance to enable same to disengage the flange 21. This thus permits the clips 37 and 38 to be moved downwardly below the flange 21, whereupon the leg portions 26A and 27A can then be permitted to resiliently return to their inner positions wherein they are adjacent one another and the holder 11 can then be rotated horizontally through an angle of approximately 90° to disengage the clips 31 and 33 from the flange 21.

As is readily apparent from the description set forth above, the improved holder 11 of the present invention can be readily attached to or detached from a rail associated with a suspended ceiling in an easy and economical manner without requiring elaborate tools or the like. Further, the attachment to the overhead rail can be accomplished without disturbing the ceiling panels. Still further, the structure of the holder is extremely simple and durable, and can be produced very economically.

While the light mounting means 17 has been disclosed as comprising a cylindrical post, it will be appreciated that the light mounting means 17 may assume whatever configuration and structure desired in order to cooperate with a conventional light. Similarly, the manner in which the light is attached to the light mounting means can also be varied as desired in accordance with the type of conventional light utilized.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A light holder adapted to be suspended from an elongated rail having oppositely extending lateral flanges, comprising:

a support portion having a first pair of oppositely-facing clips mounted thereon adapted for supporting engagement with said flanges, and light mounting means secured to said support portion for mounting a light thereon;

a pair of elongated members connected to said support portion and extending away therefrom in adjacent and substantially parallel relationship so that said elongated members are adapted to extend lengthwise of said rail, said members being relatively movable laterally toward and away from each other, a second pair of oppositely facing clips respectively mounted on said elongated members at locations spaced from said first pair of clips and adapted for supporting engagement with said flanges, said elongated members permitting relative lateral movement between the clips of said second pair so that at least one of the clips of said second pair can be moved laterally relative to said support portion into and out of supporting engagement with its associated flange of said rail.

2. A light holder according to claim 1, wherein the clips of one pair are U-shaped in cross section and open toward one another.

3. A light holder according to claim 2, wherein the clips of the other pair are also U-shaped in cross section and open toward one another.

4. A light holder according to claim 1, wherein the clips of said first pair are spaced a predetermined distance apart in the longitudinally extending direction of the rail, and wherein the clips of the second pair are disposed substantially directly opposite one another.

5. A light holder according to claim 1, wherein the clips of said second pair are respectively mounted on said elongated members adjacent the free ends thereof.

6. A light holder according to claim 5 wherein the clips of said first pair are spaced apart with respect to one another along the longitudinally extending direction of the rail when the holder is mounted thereon.

7. A light holder according to claim 5 wherein said members are normally positioned with the free ends thereof disposed closely adjacent one another; the free ends of said members being resiliently flexible so as to be movable outwardly relative to one another so that the clips of said second pair are spaced outwardly from one another by a sufficient distance to enable the flanges said rail to be inserted therebetween, the free ends of said members being normally resiliently urged inwardly toward one another for causing the clips of said second pair to be automatically moved toward one another to engage said flanges therebetween.

8. A light holder according to claim 7 wherein a locking ring is disposed in surrounding relationship to said members and is slidable longitudinally therealong for locking the free ends of said members in a position closely adjacent one another for holding said second pair of clips in engagement with said flanges.

9. A light holder according to claim 8, wherein the clips of said first pair are spaced a predetermined distance apart as viewed in the longitudinally extending direction of said rail when said holder is mounted thereon.

10. A light holder according to claim 5, wherein the pair of elongated members can be elastically flexed relative to one another between a first position wherein the free ends thereof are positioned closely adjacent one another and a second position wherein the free ends thereof are spaced outwardly a substantial distance from one another, the clips of said second pair being spaced apart by a sufficient distance to enable the flanges of an elongated rail to be positioned therebetween when the free ends of said members are in said second position, and the clips of said second pair being positioned closely adjacent one another whereby they are capable of engaging the flanges of an elongated rail positioned therebetween when the free ends of said members are in said first position, the free ends of said members being continuously resiliently urged into one of said first and second positions.

11. A light holder according to claim 10, wherein a locking ring is disposed in surrounding relationship to said members and is slidable longitudinally therealong for holding the free ends of said members in said first position when said locking ring is disposed closely adjacent said second pair of clips, said locking ring being slidably movable from a position adjacent said second pair of clips to a further position adjacent said first pair of clips, said locking ring when in said further position permitting the free ends of said members to be relatively moved outwardly into said second position.

* * * * *